Figure 1:
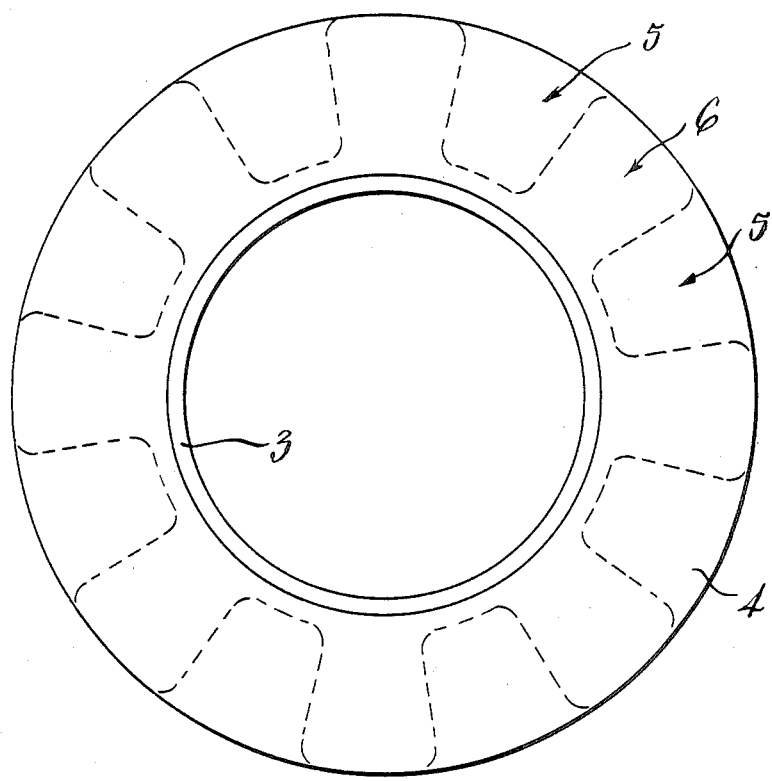

United States Patent [19]

East et al.

[11] Patent Number: 4,747,476

[45] Date of Patent: May 31, 1988

[54] METHODS OF MAKING CLUTCH DRIVEN PLATES

[75] Inventors: Roy G. East, Buxton; John D. Harding, Chapel en le Frith, both of England

[73] Assignee: Ferodo Limited, Manchester, England

[21] Appl. No.: 881,281

[22] Filed: Jul. 2, 1986

[30] Foreign Application Priority Data

Jul. 16, 1985 [GB] United Kingdom ................ 8517930

[51] Int. Cl.$^4$ .............................................. F16D 69/04
[52] U.S. Cl. .......................... 192/107 M; 192/107 R; 523/155
[58] Field of Search ....................... 192/107 M, 107 R; 156/290, 307.7, 313; 523/155, 152

[56] References Cited

U.S. PATENT DOCUMENTS

| | | | |
|---|---|---|---|
| 1,414,490 | 5/1922 | Tresslar | 192/113 A X |
| 1,754,233 | 4/1930 | Fisher | 192/107 R |
| 1,852,047 | 4/1932 | Fisher . | |
| 2,059,576 | 11/1936 | Glick | 192/107 R |
| 2,553,215 | 5/1951 | Schultz . | |
| 2,855,081 | 10/1958 | Morton | 192/107 M |
| 3,316,138 | 4/1967 | Taylor | 192/107 M X |
| 4,656,203 | 4/1987 | Parker | 523/155 |
| 4,663,368 | 5/1987 | Harding et al. | 523/155 |

FOREIGN PATENT DOCUMENTS

| | | |
|---|---|---|
| 1008801 | 11/1965 | United Kingdom . |
| 2044864 | 10/1980 | United Kingdom . |
| 2155028 | 9/1985 | United Kingdom . |
| 2165851 | 4/1986 | United Kingdom . |

OTHER PUBLICATIONS

Patent Abstracts of Japan, vol. 7, No. 128 (M-220) [1273], 3 Jun. 1973, FP-A-58 231 (Nihon Barukaa Kogyo KK).

Primary Examiner—Rodney H. Bonck
Attorney, Agent, or Firm—Nixon & Vanderhye

[57] ABSTRACT

A method of manufacturing clutch driven plates wherein a castellated core plate is sandwiched between two clutch facing annuli in which the thermosetting binder is substantially uncured. The assembly is clamped together and heated to cure the binder and bond the annuli to the core plate.

The friction material of the facing annuli is pushed under the clamping pressure into the spaces between the castellations of the core plate and in the preferred clutch driven plates made by this method the inner surfaces of the facing annuli come into contact but do not bond together substantially.

14 Claims, 2 Drawing Sheets

METHODS OF MAKING CLUTCH DRIVEN PLATES

This invention relates to clutches and in particular to a low inertia driven-plate for a low-inertia clutch assembly.

In UK patent application No. 2044 864A there is described a clutch driven-plate in which two co-axial friction facings are moulded directly onto a respective carrier plate the two carrier plates being joined together at their inner margin and resiliently spaced apart between the friction facings.

In order to reduce the inertia of the driven plate it was proposed to utilize a single core plate with castellations between the friction facings and bond two moulded facings direct on to such a core plate. A problem which arose was that the facings when so bonded tended to de-bond when subjected to vehicle hill-start test. This was thought to be caused by the area of the facings over the castellations taking more of the load, the drive plate functioning as a series of islands over the castellations which were relatively incompressible and adjacent islands where there were gaps in the core plate which were resilient and therefore taking a lower share of the compressive load. The result was excessive temperatures in the islands over the castellations which caused the de-bonding.

We have now found a method of manufacturing a clutch driven plate which obviates these difficulties.

The present invention provides a method for manufacture of a clutch driven plate which comprises
(a) forming a pair of clutch facing annuli which are substantially of the density required in the finished facings but in which a thermosetting binder material is substantially uncured,
(b) assembling said pair of annuli on either side of a castellated core plate for a clutch driven plate
(c) clamping together said assembly under a pressure sufficient to ensure intimate contact between touching surfaces within it but insufficient to cause substantial change in the density of the annuli
(d) heat-curing the thermosetting binder of the annuli and bonding them to the core plate.

We have found that when the driven plate is manufactured by this method a driven plate assembly is produced in which the gaps between the castellations of the core plate are at least partially filled with friction material. It is desirable that there be no bond developed between the two facings where they come into contact between the castellations.

Thus the present invention also provides a clutch driven plate made by the method outlined above comprising a castellated core plate and a pair of annular facings of friction material bonded one to each side of said core plate wherein the radially outer ends of the castellations of the core plate are not enclosed by the friction material of the facings and the said friction material extends into the gaps between said castellations to the extent that the inner faces of the two facings contact each other to provide mutual support but remain substantially unbonded to each other.

Preferably the external diameters of the two facings and the core plate are all substantially the same. Preferably the core plate is of metal and the area of the core plate which contains the castellations preferably contains at least as much area of metal as there is area of space between castellations.

In the spaces between the castellations the friction material of the facings is in contact without substantial bonding, so leaving the facings free to be independently resilient but providing support against compressive forces. Preferably the area of contact between the inner surfaces of the two facings is 10 to 95% of the area of space between the castellations of the core plate.

The preferred clutch facings used in the present invention are non-asbestos clutch facings each comprising reinforcing fibres embedded in a matrix of binder material, in which the actual density of each facing is such that the facing is permeable to air under a pressure differential of 1 atmosphere. Preferably the amount of reinforcing fibres in each facing is between 4 and 60 percent by weight of the facing. Such facings are described in our UK Published patent application No. 2 155028 A.

Further suitable facings having characteristics useful in the present invention are disclosed in Published UK patent application No. 2 165851 A wherein the non-asbestos clutch facings disclosed have an actual density which is less than 72% of their theoretical density and may have a specific gravity in the range 0.8 to 1.4.

The preferred method for the manufacture of a clutch driven plate incorporating such a facing comprises mixing reinforcing fibres and curable binder material and, optionally, friction and wear modifiers, forming a preform comprising said mixture in the rough shape of a clutch facing, heating and pressing said preform to compress it, without substantially curing the binder material, and form a consolidated annulus with an actual density where the facing produced is permeable to air, assembling a pair of the annuli with a core plate for the driven plate and then completing cure of the binder in the annuli by heating under conditions of pressure such as to not cause any substantial further compression of the annuli.

The preferred non-asbestos clutch facings used in this invention incorporate reinforcing fibres which may be inorganic or organic or mixtures of fibres in which both types are present. Typically the clutch facings may include fibres of glass, mineral wool, alumino-silicate, metals such as steel, cellulose, polyamides, particularly aromatic polyamides such as those available from Du-Pont under the trade mark KEVLAR, polyacrylonitrile, polyvinyl alcohol and so on. Preferably the fibres used are in the form of staple fibres and although the length of fibres used is not critical it would generally be in the range 1-10 mm for most purposes.

The amount of reinforcing fibres in the facings is preferably in the range 10 to 60 percent by weight.

The binder material mentioned previously is preferably based on binder polymers usual for use in clutch facings such as resins based on phenol and formaldehyde and related resins, and rubbers such as nitrile rubber, natural rubber and styrene-butadiene rubber. Mixtures of resin and rubber may be used, the particular combination of polymers chosen depending upon the manufacturing characteristics desired and properties in the finished facing. The amount of binder polymers employed will generally be in the range 10 to 35 percent by weight of the facing.

Friction and wear modifiers and fillers of the usual types may be employed, examples of such materials being carbon black, graphite, talc, friction dust and metal powders, e.g., brass, copper, metallic sulphides.

The actual density of the preferred facings indicates that they have a substantial void content and in the facings the voids are, at least to some extent, interconnected so that the facings have a degree of permeability to air. The actual density of the facings is preferably not greater than 90 percent and preferably also not less than 60 percent of the theoretical density.

Clutch facings having a specific gravity lower than usual are advantageous in this invention. For example having a specific gravity below 1.4 and possibly as low as 0.8 as disclosed in UK patent application No. 2 165851 A.

Figure 2:
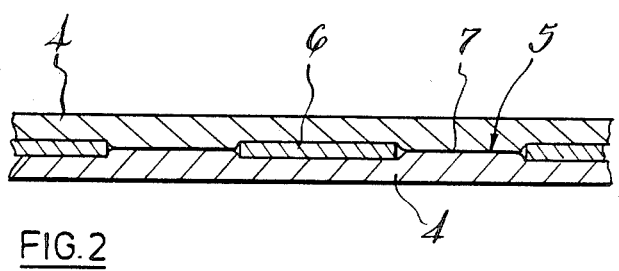

The invention will now be more particularly described, by way of example only, with reference to the accompanying drawings of which FIG. 1 is a face view of a clutch driven plate showing also in dotted lines the shape of a core plate embedded between two clutch facings FIG. 2 is a partial edgewise view of the driven plate of FIG. 1.

Figure 3:
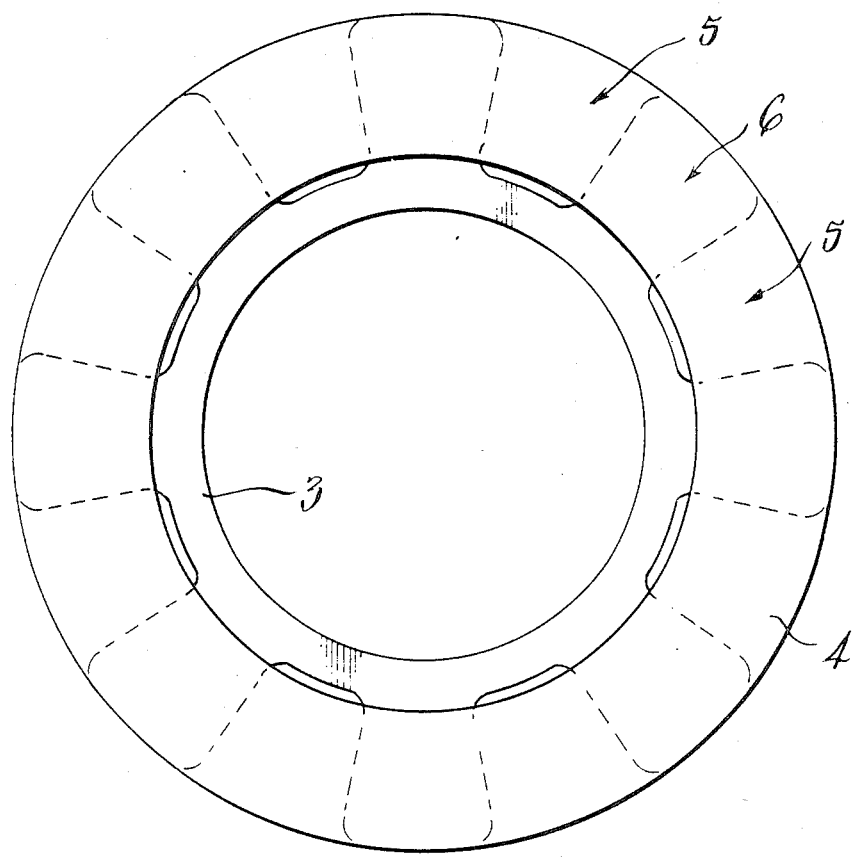

FIG. 3 is a face view of a clutch driven plate similar to FIG. 1, but illustrating an alternative embodiment".

As shown in FIG. 1 the clutch driven plate incorporates a core plate 3, whose castellated outline shape is shown in FIG. 1 in dotted lines. A pair of annular clutch facings 4 sandwich the castellated area of the core plate 3.

The gaps 5 between castellations 6 of the core plate are partially filled with the material of the facings as shown in FIG. 2 of the drawings. The material of the two facings actually meets over an area 7 but the two facings are not bonded together over this area.

In the manufacture of the clutch driven plate, preforms of the desired shape are first made from a mixture of non-asbestos fibre or fibres, thermosetting resin binder and particulate friction modifiers and fillers by any convenient method e.g., by dispersing the components in water to form a slurry, dispersing the slurry into a suitably shaped die then removing most of the water by the application of pressure to form a preform which is then dried to remove the residual water. Elastomers, particularly in the form of latices, may also be included to improve preform strength and stiffness of the binder system. The dried preform is heated to a temperature above the melting or softening point of the binder resin by a suitable means such as conduction from a heated metal plate or by electromagnetic radiation and is then pressed in a fully enclosed die for a short period to form a consolidated annulus (without cure taking place) having the desired proportion of its theoretical density. The still warm consolidated annulus is ejected from the die and allowed to cool under a weight to prevent distortion.

A pair of the consolidated annuli are then assembled one on each side of a core plate of the castellated type shown in FIG. 1 of the same external diameter as the annuli, which has been pre-coated in those areas which will contact the preforms with an appropriate adhesive. Suitable adhesives are, for example, phenol-formaldehyde resins which may or may not be modified e.g., with elastomers or polyvinyl formal. The exterior surfaces of the annuli may then be coated with a release agent such as talc -or may be separated by suitable non stick separators, and the driven plate assemblies are then clamped between formers and heated at elevated temperatures, usually in the range of 150° C. to 250° C., to complete the cure of the binder.

The core plate is preferably of metal, having a thickness in the range 0.50 mm to 1.2 mm, for example about 0.7 mm, and the castellated area is substantially the whole of the area to which the facings are to be bonded.

A minimum period of baking, dependent on the temperature employed, is essential to cure the binder to the necessary degree and bond the annuli to the core plate. A typical baking period is four hours at 200° C.

In the consolidation step, which involves pressing an annular shaped preform in a fully enclosed annular shaped die, the die may be fitted with plain or ribbed faces to produce ungrooved or grooved facings as desired.

During the cure of the binder with the annuli clamped to the core plate, slight distortion of the shape of the annuli takes place because between castellations the annuli are unsupported.

This results in the gaps between castellations becoming at least partially filled with friction material without distortion of the external face of the finished facing or substantial change in facing density. There is some slight reduction in the density of the friction material between core plate castellations as the material swells into the gap. The preferred result is illustrated by FIG. 2 of the accompanying drawings where material of the two facings has come into contact in part of the area between the castellations. The two facings, however, have not come into such intimate contact that they bond to each other, and the outer ends of the castellations remain visible, and unenclosed by friction material.

When a vehicle equipped with a clutch driven plate of the preferred configuration as shown in FIGS. 1 and 2 was subjected to a vehicle hill start test, the vehicle completed the 25 starts necessary to pass the test without showing any thermal stress either to the clutch driven plate or to the opposing parts of the clutch.

When the same vehicle was equipped with a clutch driven plate with a similar core plate to which two cured facings of the same formulation and cure as those tested above had been bonded (leaving the gaps between core plate castellations unfilled) it failed the hill start test because the facings de-bonded from the core after only 15 to 20 hill starts.

It will be noted that in FIG. 1 the castellated area of the core plate is shown as slightly less than the area of the facings being bonded thereto. However, to improve conformability of the assembly further it is preferable that the radial length of the spaces between castellations is somewhat greater than the flange width of the facings as illustrated diagrammatically in FIG. 3.

We claim:

1. A method for the manufacture of a clutch driven plate consisting essentially of the following steps:
    (a) forming a pair of clutch facing annuli which are substantially the density of the finished facings but in which a thermosetting binder material is substantially uncured;
    (b) assembling said pair of annuli on either side of a castellated core plate for a clutch driven plate;
    (c) clamping together said assembly under a pressure sufficient to ensure intimate contact between touching surfaces but insufficient to cause substantial change in the density of the annuli; and
    (d) heating-curing the thermosetting binder of the annuli bonding the annuli to the core plate, wherein the clamping pressure applied to the assembly in steps (c) and (d) is sufficient to result in contact between the inner surfaces of the two annuli in the spaces between the castellations of the core plate but insufficient to result in bonding between said inner surfaces in the area of contact between them.

2. A method according to claim 1 in which the core plate is coated with adhesive before being brought into contact with the annuli.

3. A method according to claim 1 which comprises forming the clutch facing annuli by mixing reinforcing fibres and curable binder material and friction and wear modifiers, forming a preform comprising said mixture in the rough shape of a clutch facing, heating and pressing said preform to compress it without substantially curing the binder material, and form a consolidated annulus with an actual density where the facing produced is permeable to air, assembling a pair of the annuli with a castellated core plate for the driven plate and then completing cure of the binder in the annuli by heating under conditions of pressure such as to avoid any substantial further compression of the annuli but sufficient to cause some flow of the material of the annuli into the spaces between the castellations of the core plate.

4. A method according to claim 1 in which annuli are moulded from performs which comprise a composition fibres, particulate materials and binder deposited in the form of an aqueous slurry into a mould where the slurry is dewatered, and the preforms so made are moulded to form said clutch facing annuli.

5. A method according to claim 1 in which said clamping pressure is such as to cause contact between the inner surfaces of said annuli over an area which is 10% to 95% of the area between the castellations of the core plate.

6. A clutch driven plate made by the method as claimed in claim 1 consisting essentially of a castellated core plate and a pair of clutch facing annuli of friction material bonded one to each side of said core plate wherein the ends of the castellations of the core plate are not enclosed by the friction material of the facings, and said friction material extends between said castellations to the extent that the inner faces of the facings contact each other to provide mutual support but remain substantially unbonded to each other.

7. A clutch driven plate according to claim 6 in which the area of contact between the inner surfaces of the two facings is between 10% and 95% of the area between the castellations of the core plate.

8. A clutch driven plate according to claim 6 in which the external diameters of the facings and of the core plate are substantially the same.

9. A clutch driven plate according to claim 6 in which the clutch facings are non-asbestos clutch facings each comprising reinforcing fibres embedded in a matrix of binder material, in which the actual density of each facing is such that the facing is permeable to air under a pressure differential of 1 atmosphere.

10. A clutch driven plate according to claim 9 in which the amount of reinforcing fibres is between 4 and 60 percent by weight of the facing.

11. A clutch driven plate according to claim 10 in which the annular facings have an actual density which is from 60 percent to 90 percent of their theoretical density.

12. A clutch driven plate according to claim 9 in which the annular facings have a specific gravity which is less than 1.4.

13. A clutch driven plate according to claim 6 in which, in the area of said castellated core plate which contains the castellations there is at least as much plate area as space.

14. A clutch driven plate according to claim 6 in which the width of said facings is less than the radial length of the spaces between the castellations in the core plate.

* * * * *